(12) United States Patent
Lee

(10) Patent No.: US 9,389,640 B2
(45) Date of Patent: Jul. 12, 2016

(54) PORTABLE COMPUTING APPARATUS

(71) Applicant: SAMSUNG Electronics Co., Ltd., Suwon-si, Gyeonggi-do (KR)

(72) Inventor: Myoung-kyu Lee, Hwaseong-si (KR)

(73) Assignee: SAMSUNG ELECTRONICS CO., LTD., Suwon-Si (KR)

( * ) Notice: Subject to any disclaimer, the term of this patent is extended or adjusted under 35 U.S.C. 154(b) by 93 days.

(21) Appl. No.: 14/079,697

(22) Filed: Nov. 14, 2013

(65) Prior Publication Data

US 2014/0347802 A1 Nov. 27, 2014

(30) Foreign Application Priority Data

May 26, 2013 (KR) .................. 10-2013-0059405

(51) Int. Cl.
*G06F 1/16* (2006.01)

(52) U.S. Cl.
CPC ............ *G06F 1/1626* (2013.01); *G06F 1/1632* (2013.01); *G06F 1/1654* (2013.01)

(58) Field of Classification Search
CPC ... G06F 1/1601; G06F 1/1607; G06F 1/1616; G06F 1/1622; G06F 1/1632; G06F 1/1633; G06F 1/1634; G06F 1/1643; G06F 1/1637; G06F 1/1649; G06F 1/1654; G06F 1/1662; G06F 1/1669; G06F 1/1639
USPC .................. 361/1–679.44, 679.55, 679.56
See application file for complete search history.

(56) References Cited

U.S. PATENT DOCUMENTS

| | | | | |
|---|---|---|---|---|
| 5,355,279 A * | 10/1994 | Lee | ........................ | G06F 1/162 345/905 |
| 6,937,468 B2 * | 8/2005 | Lin | ........................ | G06F 1/1632 361/679.41 |
| 7,487,940 B2 * | 2/2009 | Saez | ........................ | A47B 23/043 248/176.1 |
| 7,656,652 B2 * | 2/2010 | Moser | ........................ | G06F 1/1616 206/457 |
| 8,599,542 B1 * | 12/2013 | Healey | ........................ | G06F 1/1626 345/168 |
| 8,608,123 B2 * | 12/2013 | Takahashi | ........................ | H04M 1/04 248/346.01 |
| 8,934,234 B2 * | 1/2015 | Lin | ........................ | 361/679.41 |
| 8,986,029 B2 * | 3/2015 | Webb | ........................ | H05K 7/14 174/135 |
| 2004/0190234 A1 * | 9/2004 | Lin | ........................ | G06F 1/162 361/679.28 |
| 2005/0111182 A1 * | 5/2005 | Lin | ........................ | G06F 1/1632 361/679.41 |
| 2009/0141439 A1 * | 6/2009 | Moser | ........................ | G06F 1/1616 361/679.29 |
| 2010/0321877 A1 * | 12/2010 | Moser | ........................ | G06F 1/1616 361/679.29 |
| 2011/0199319 A1 * | 8/2011 | Moser | ........................ | G06F 1/1654 345/173 |
| 2011/0199726 A1 * | 8/2011 | Moser | ........................ | G06F 1/1654 361/679.09 |
| 2011/0292584 A1 * | 12/2011 | Hung | ........................ | G06F 1/1632 361/679.26 |
| 2012/0212900 A1 * | 8/2012 | Hung | ........................ | G06F 1/1632 361/679.41 |
| 2012/0293942 A1 * | 11/2012 | Moser | ........................ | G06F 1/1616 361/679.26 |
| 2012/0327594 A1 | 12/2012 | Gengler | | |
| 2013/0039000 A1 * | 2/2013 | Vicente et al. | ........... | 361/679.41 |
| 2013/0170126 A1 * | 7/2013 | Lee | ........................ | 361/679.17 |
| 2013/0170131 A1 * | 7/2013 | Yen | ........................ | G06F 1/1632 361/679.44 |
| 2015/0055289 A1 * | 2/2015 | Chang | ........................ | G06F 1/1632 361/679.43 |

* cited by examiner

*Primary Examiner* — Hoa C Nguyen
*Assistant Examiner* — Sagar Shrestha
(74) *Attorney, Agent, or Firm* — Staas & Halsey LLP

(57) ABSTRACT

A portable computing apparatus according to an exemplary embodiment of the present general inventive concept includes a first device, and a second device having a coupling groove where the first device is detechably coupled, where the first device has a first coupling position where a first end of the first device is coupled with the coupling groove by a first connection angle, and a second coupling position where a second end of the first device is coupled with a second connection angle different from the first connection angle.

17 Claims, 20 Drawing Sheets

PORTABLE COMPUTING APPARATUS

CROSS-REFERENCE TO RELATED APPLICATIONS

This application claims priority under 35 U.S.C. §119(a) from Korean Patent Application No. 2013-0059405, filed in the Korean Intellectual Property Office on May 26, 2013, the disclosure of which is incorporated herein in its entirety by reference.

BACKGROUND OF THE INVENTION

1. Field of the Invention

Methods and apparatuses of the exemplary embodiments of the present general inventive concept relate to a portable computing apparatus, and more particularly to a portable computing apparatus having a first device and a second device that may couple with each other at two or more connection angles.

2. Description of the Related Art

Tablet computers are becoming more widespread due to their portability and light weight.

A tablet computer has a display part that displays images and a computing part (i.e., the so called main body part) that performs computing operations integrated therein, and thus may be used independently without being connected to another device. A tablet computer generally has a touch screen so that it may be used without the help of another input device.

As such, it is of course possible to use a tablet computer independently, but it is also possible to temporarily connect the tablet computer to a keyboard device and then use the same for a more quick and convenient inputting operation.

In such a case, it is possible to have the tablet computer directly connected to the keyboard device instead of having it held by another stand. That is, the keyboard device may perform the function of an inputting device and a stand at the same time.

For example, the tablet computer may be connected to the keyboard device as its lower portion is connected to a mounting slot provided in the keyboard device. In such a case, the tablet computer is connected to the keyboard device in one specific connection angle. Thus, it is difficult to satisfy user's requests for various connection angles.

The tablet computer and the keyboard device may be connected to each other in a hinge structure. In such a case, the angle of the tablet computer to the keyboard may be selected from various angles. However, in this case, at least some of the components of the tablet computer are provided in the tablet computer or the keyboard in such a manner that they are exposed to the outside, and thus may deteriorate the exterior design of the tablet computer or keyboard.

SUMMARY OF THE INVENTION

Therefore, exemplary embodiments of the present general inventive concept provide a coupling structure between a portable device (for example, a tablet computer) and keyboard device that can supply two or more connection angles without a hinge structure.

Additional features and utilities of the present general inventive concept will be set forth in part in the description which follows and, in part, will be obvious from the description, or may be learned by practice of the general inventive concept.

An exemplary embodiment of the present general inventive concept provides a portable computing apparatus including a first device, and a second device having a coupling groove where the first device is detachably coupled, where the first device has a first coupling position where a first end of the first device is coupled with the coupling groove by a first connection angle, and a second coupling position where a second end of the first device is coupled with a second connection angle different from the first connection angle.

Each of the first end and second end of the first device may have an exterior shape matching that of the coupling groove.

The second device may include a fixing member that protrudes from an inner surface of the coupling groove with a protruding angle, and the first device may have a first fixing member insertion groove formed on the first end so that the fixing member is inserted at the first coupling position, and a second fixing member insertion groove formed on the second end so that the fixing member is inserted at the second coupling position.

The protruding angle may be same as the first connection angle.

Each of the first fixing member insertion groove and second fixing member insertion groove may have a shape matching that of the fixing member.

The first device may have an image display surface, and an inclination angle of the first fixing member insertion groove with respect to the image display surface and an inclination angle of the second fixing member insertion groove with respect to the image display surface may be different from each other.

A difference between the inclination angle of the first fixing member insertion groove and the inclination angle of the second fixing member insertion groove may be same as a difference between the first connection angle and the second connection angle.

On each inner surface of the first and second fixing member insertion grooves, a transmission connector may be provided, and on the fixing member, there may be formed a connector insertion groove where the transmission connected is inserted when the first device is coupled with the second device.

On an inner surface of the coupling groove, at least one guide pin may be provided for guiding a coupling between the first device and second device, and on a first end of the first device, there may be provided at least one first pin groove where the guide pin is inserted at the first coupling position, and on a second end of the first device, there may be formed at least one second pin groove where the guide pin is inserted at the second coupling position.

The first fixing member insertion groove may have a same inclination angle as the first pin groove, and the second fixing member insertion groove and the second pin groove may have a same inclination angle.

An inner surface of the coupling groove may include a first support surface to support a front surface of the first device and a second support surface to support a rear surface of the first device, and to each of the first support surface and second support surface, at least one protection member for preventing damage of the first device may be attached.

The first end and second end of the first device may be a lower end and upper end of the first device.

The first end and second end of the first device may be a left end and right end of the first device.

The first device may further have a third coupling position where a third end of the first device is coupled with the coupling groove, and a fourth coupling position where a fourth end of the first device is coupled with the coupling groove.

The first end, second end, third end, and fourth end of the first device may be a lower end, upper end, left end, and right end of the first device.

The first device may be a tablet computer, and the second device may be a keyboard device used as an input device for the tablet computer.

The coupling groove may be extended side to side on an upper end of the keyboard device.

An exemplary embodiment of the present general inventive concept may also provide a first device where a first fixing member insertion groove is formed on its first end, and a second fixing member insertion groove is formed on its second end, and a second device having a fixing member insertable into the first and second fixing members, where the first device is coupled with the second device in a detachable manner by a coupling between the first fixing member insertion groove and the fixing member by a first connection angle, or coupled with the second device by a coupling between the second fixing member insertion groove and the fixing member by a second connection angle different from the first connection angle.

The second device may have a coupling groove where a first end or second end of the first device is inserted when the first device and second device are coupled with each other, and the fixing member may be disposed in the coupling groove.

The first device may have an image display surface, and an inclination angle of the first fixing member insertion groove with respect to the image display surface and an inclination angle of the second fixing member insertion groove with respect to the image display surface may be different from each other so that the first connection angle and the second connection angle may be different from each other.

BRIEF DESCRIPTION OF THE DRAWINGS

These and/or other features and utilities of the present general inventive concept will become apparent and more readily appreciated from the following description of the embodiments, taken in conjunction with the accompanying drawings of which.

DETAILED DESCRIPTION OF THE PREFERRED EMBODIMENTS

Figure 1:
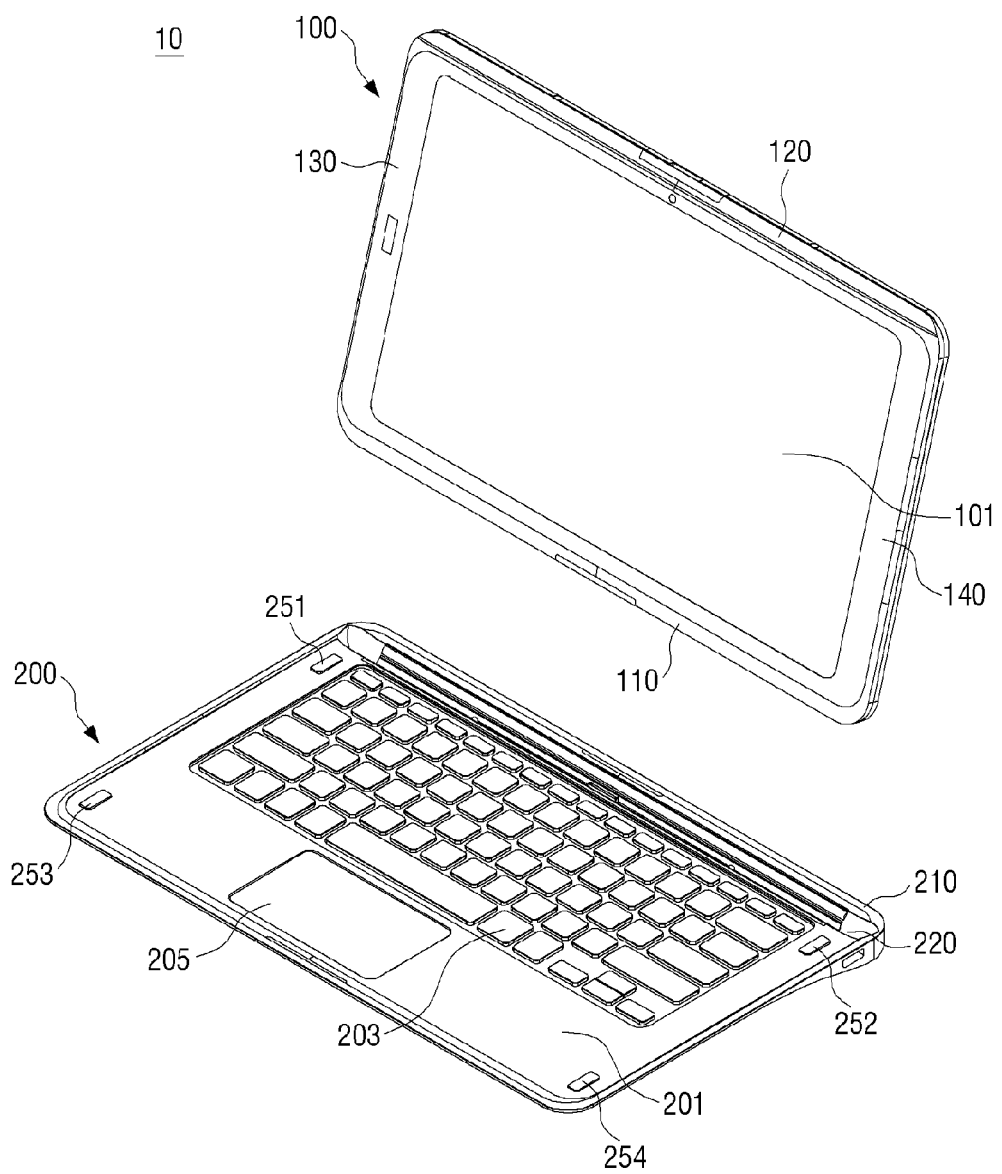
FIG. 1 is a perspective view of a portable computing apparatus according to an exemplary embodiment of the present general inventive concept.

Reference will now be made in detail to the embodiments of the present general inventive concept, examples of which are illustrated in the accompanying drawings, wherein like reference numerals refer to the like elements throughout. The embodiments are described below in order to explain the present general inventive concept while referring to the figures.

FIG. 1 is a perspective view of a portable computing apparatus according to an exemplary embodiment of the present general inventive concept. With reference to FIG. 1, the portable computing apparatus 10 according to an exemplary embodiment of the present general inventive concept includes a first device 100 and a second device 200.

As illustrated in FIG. 1, the first device 100 is a tablet computer which may perform computing operations and displaying images independently without the help of another device. Accordingly, the first device 100 is provided with a computing system (not illustrated) which performs data signal computing and data signal storing, and also an image display surface 101 for displaying images.

Referring to FIG. 1, the image display surface 101 can be a touch screen that displays one or more images, and receives input from a user's touch. In order to provide such an image display surface 101, a display panel embodied as an LCD (Liquid Crystal Display) panel, a LED (Light Emitting Diode) panel, and OLED (Organic Light Emitting Diode) panel etc. may be provided in the first device 100.

The first device 100 can include a lower end 110, an upper end 120, a left end 130, and a right end 140.

In the present exemplary embodiment, the first device 100 is a tablet computer. Alternatively, the first device 100 may be any other suitable type of portable computing device, where a computing and/or processing system and a display are integrated in one apparatus.

As illustrated in FIG. 1, the second device 200 is a keyboard device for receiving input, and performing input operations such as typing for the first device 100. Thus, a plurality of input keys 203 are provided on an upper surface 201 of the second device 200, and a touch pad 205 which can replace functions of a mouse is also provided. A user can perform input operations for the first device 100 with increased ease and quickness using such the second device 200.

On the upper end 210 of the second device 200, there is formed a coupling groove 220 to couple with the first device 100, along a longitudinal direction of the second device 200. When the second device 200 is used, as one end of the first device 100 is inserted into the coupling groove 220, the first device 100 is mounted onto the second device 200. The first device 100 is coupled with the second device 200 in a detachable manner (i.e., not in a fixed manner), and thus the first device 100 may be detached from the second device 200 and then used. More detailed explanation on the coupling structure between the first device 100 and second device 200 will be made hereinbelow.

In the present exemplary embodiment, the second device 200 is a keyboard device. Alternatively, the second device may be a stand which fixes and supports the first device 100 without supporting input functions.

Figure 2:
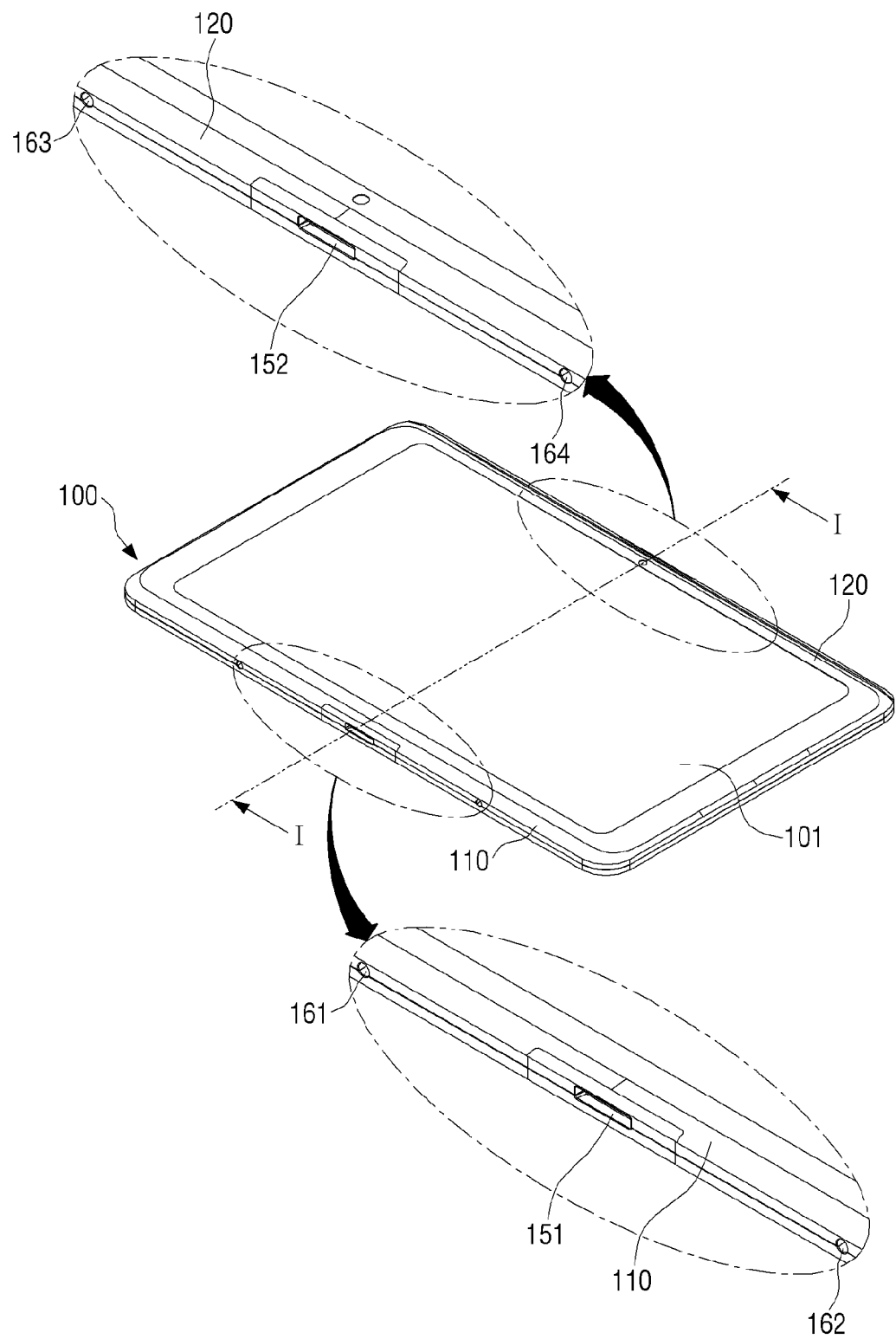
FIG. 2 is a perspective view of a first device of the portable computing apparatus illustrated in FIG. 1.
Figure 3:
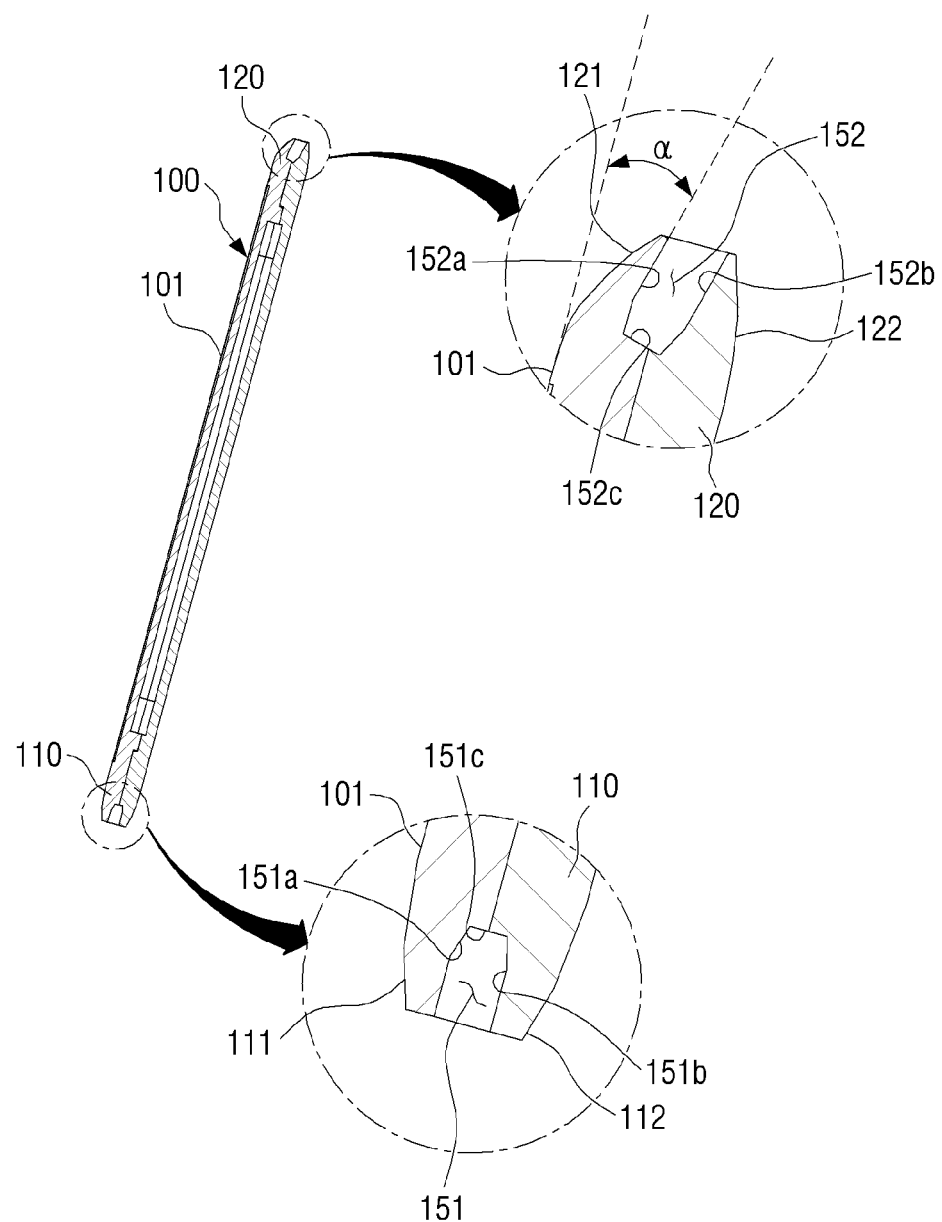
FIG. 3 is a cross-sectional view along the line I-I of the first device illustrated in FIG. 2.

FIG. 2 is a perspective view of the first device 100 of the portable computing apparatus 10 illustrated in FIG. 1, and FIG. 3 is a cross-sectional view along I-I line of the first device 100 illustrated in FIG. 2.

With reference to FIG. 2, a first fixing member insertion groove 151 and two first pin grooves 161, 162 are formed on the lower end 110 of the first device 100. More specifically, the first fixing member insertion groove 151 and two first pin grooves 161, 162 are formed on an edge surface disposed on a lower side (i.e., lower end 110) of the first device 100. The first fixing member insertion groove 151 is disposed between the two first pin grooves 161, 162. By the first fixing member insertion groove 151 and two first pin grooves 161, 162, the lower end of the first device 100 can be fixed on the coupling groove 220 of the second device 200.

With reference to FIG. 2, a second fixing member insertion groove 152 and two second pin grooves 163, 164 are formed on the upper end 120 of the first device 100. More specifically, the second fixing member insertion groove 152 and two second pin grooves 163, 164 are formed on an edge surface disposed on an upper side (i.e., upper end 120) of the first device 100. The second fixing member insertion groove 152 is disposed between the two second pin grooves 163, 164. By the first fixing member insertion groove 152 and two second pin grooves 163, 164, the upper end 120 of the first device 100 can be fixed on a coupling groove 220 of the second device 200.

With reference to FIG. 3, the first fixing member insertion groove 151 is formed concavely from a lower edge surface (i.e., lower end 110) of the first device 100, and has an inner surface including a first and second inner surfaces 151*a*, 152*b* disposed to face each other and an inner surface 151*c* disposed therebetween. On a lower end of the first device 100, a first front surface 111 and a first rear surface 112 are formed, and the first fixing member insertion groove 151 is disposed between the two surfaces 111, 112.

The first fixing member insertion groove 151 is formed in a parallel manner with an image display surface 101 of the first device 100. In other words, an inclination angle of the first fixing member insertion groove 151 with respect to the image display surface 101 is 0°. Herein, the inclination angle of the first fixing member insertion groove 151 with respect to the image display surface 101 may be defined as an angle formed between the first and second inner surfaces 151*a*, 151*b* forming the first fixing member insertion groove 151 and the image display surface 101.

The inclination angle of the first fixing member insertion groove 151 with respect to the image display surface 101 in the present exemplary embodiment is 0°, but it may be another angle (for example, 5°, 10°, 15° etc.) depending on exemplary embodiments of the present general inventive concept described herein.

The two first pin grooves 161, 162 (see FIG. 2) disposed on both sides of the first fixing member insertion groove 151 have a same inclination angle with the first fixing member insertion groove 151, and thus the inclination angle with respect to the image display surface 101 of the first pin grooves 161, 162 is 0°.

With reference to FIG. 3, the second fixing member insertion groove 152 is formed concavely from an upper edge surface (i.e., upper end 120) of the first device 100, and has an inner surface including a first and second inner surfaces 152*a*, 152*b* disposed to face each other and an inner surface 152*c* disposed therebetween. On an upper end 120 of the first device 100, a second front surface 121 and a second rear surface 122 are formed, and between the two surfaces 121, 122, the second fixing member insertion groove 152 is disposed.

The second fixing member insertion groove 152 is formed against the image display surface 101 of the first device 100 at an angle. In other words, an inclination angle α of the second fixing member insertion groove 152 with respect to the image display surface 101 is not 0° (i.e., the inclination angle α is an angle other than 0°). Herein, the inclination angle α of the second fixing member insertion groove 152 with respect to the image display surface 101 may be defined as an angle formed between the first and second inner surfaces 152*a*, 152*b* forming the second fixing member insertion groove 152 and the image display surface 101. In the present exemplary embodiment, the inclination angle α of the second fixing member insertion groove 152 with respect to the image display surface 101 is approximately 20°, but it may be another angle (e.g., 15°, 25°, 30°) according to exemplary embodiments of the present general inventive concept.

The two second pin grooves 163, 164 (see FIG. 2) disposed on both sides of the second fixing member insertion groove 152 have a same inclination angle with the second fixing member insertion groove 152, and thus in the present exemplary embodiment, the inclination angle of the second pin grooves 163, 164 with respect to the image display surface 101 is approximately 20°. Alternatively, when the inclination angle α of the second fixing member insertion groove 152 with respect to the image display surface 101 may be an angle other than 20° (e.g., 15°, 25°, 30°), the second pin groove 163, 164 may have the same or similar inclination angle.

It can be seen that the inclination angle α of the second fixing member insertion groove 152 with respect to the image display surface 101 is different from the inclination angle of the first fixing member insertion groove 151 with respect to the image display surface 101 (e.g., where the inclination angle is 0°). As such, since the inclination angle of the first fixing member insertion groove 151 and the inclination angle of the second fixing member insertion groove 152 are different from each other, the angle between the two devices 100, 200 when the lower end 110 of the first device 100 is coupled with the second device 120 becomes different from the angle between the two devices 100, 200 when the upper end 120 of the first device 100 is coupled with the second device 120. This will be explained in more detail hereinbelow.

Figure 4A:
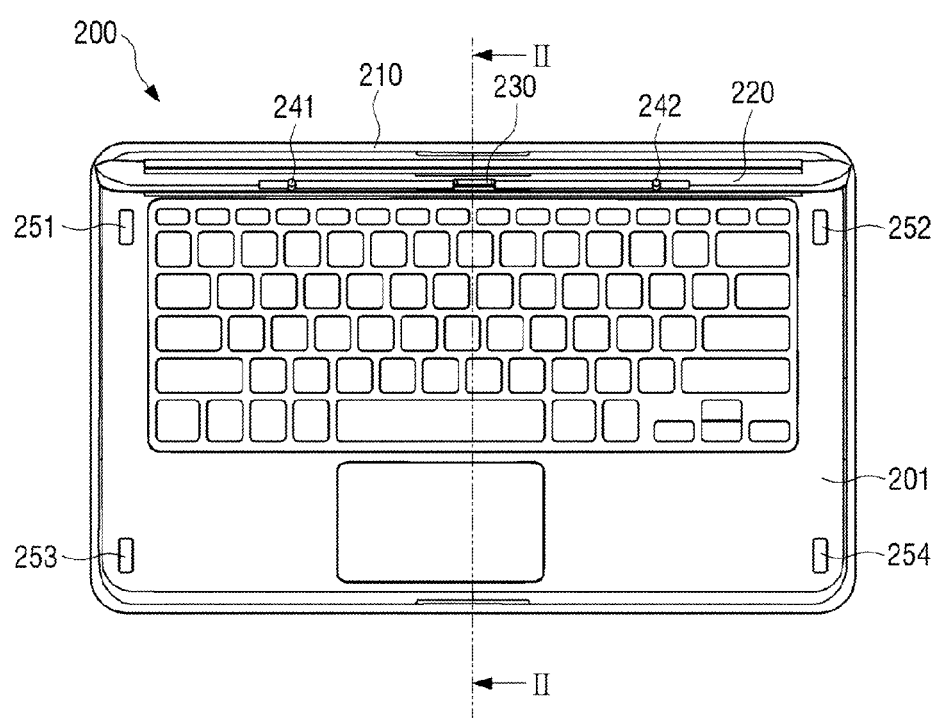
FIG. 4A is a top view of a second device of the portable computing apparatus illustrated in FIG. 1.
Figure 4B:
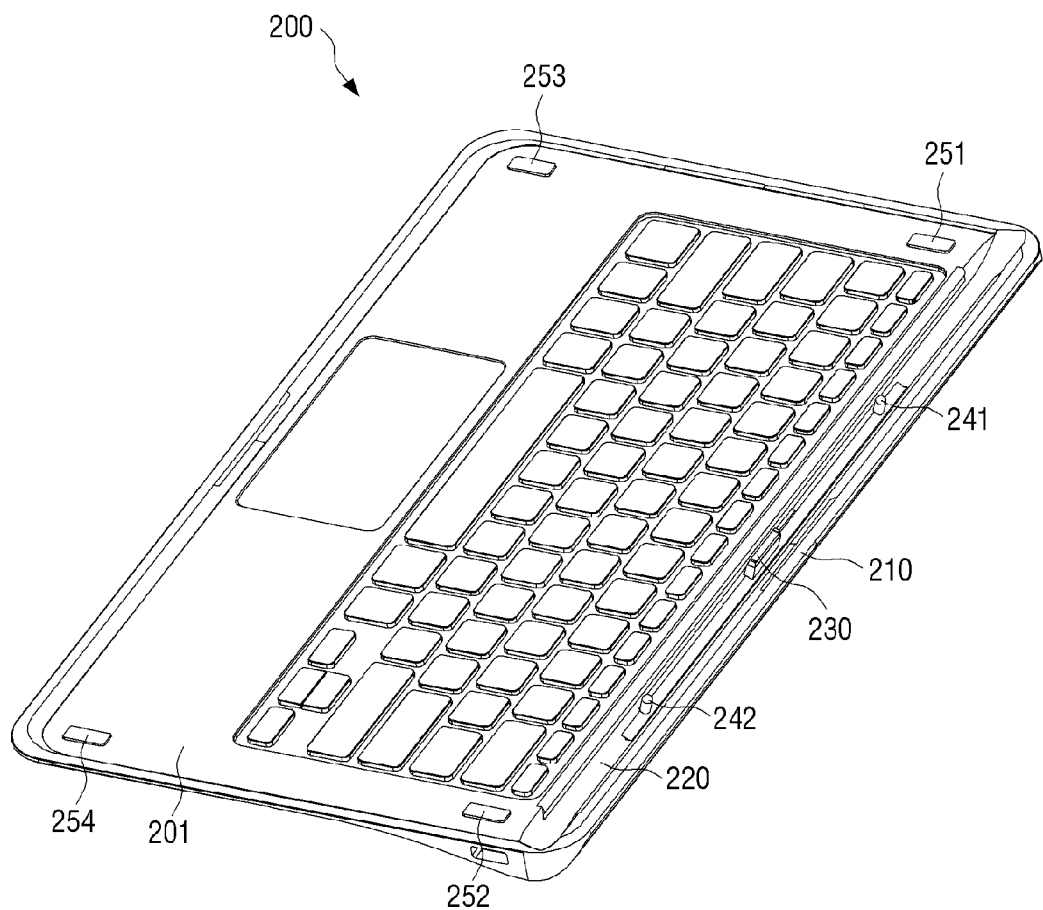
FIG. 4B is a perspective view of the second device of the portable computing apparatus illustrated in FIG. 1.
Figure 5:
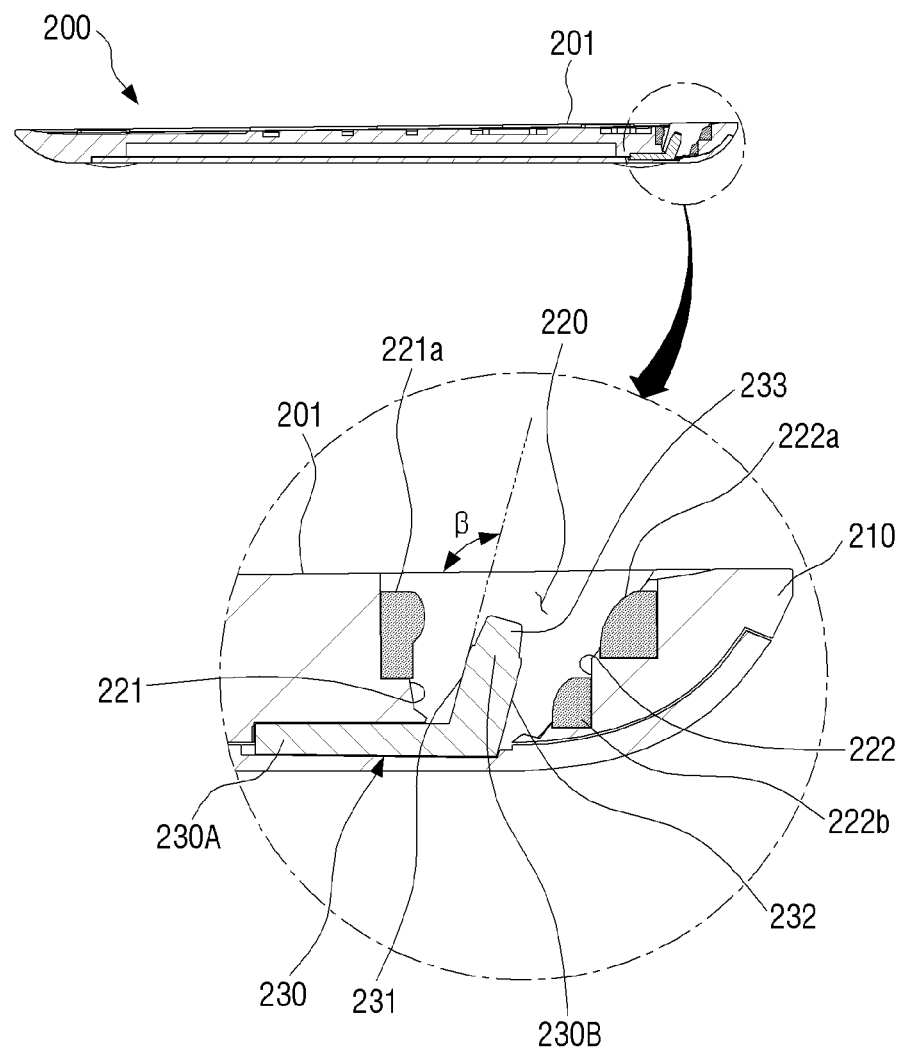
FIG. 5 is a cross-sectional view along II-II line of the second device illustrated in FIG. 4A.

FIG. 4A is a plane view of the second device 200 of the portable computing apparatus 10 illustrated in FIG. 1, FIG. 4B is a perspective view of the second device 200 of the portable computing apparatus 10 illustrated in FIG. 1, and FIG. 5 is a cross-sectional view along II-II line of the second device illustrated in FIG. 4A.

With reference to FIGS. 4A and 4B, inside the coupling groove 220 of the second device 200, there is provided two guide pins 241, 242 and a fixing member 230 disposed therebetween.

The two guide pins 241, 242 are inserted into the aforementioned first pint grooves 161, 162 or second pin grooves 163, 164, thereby guiding a combination of the first device 100 with the second device 200 and supporting the first device 100 when it is coupled with the second device 200. The guide pins 241, 242 have shapes matching the first pin grooves 161, 162 and second pin grooves 163, 164. In the case of the present exemplary embodiment, the guide pins 241, 242 have the shape of a cylinder, but in other exemplary embodiments, they may be one of other shapes (for example, square cylinder, elliptic cylinder). That is, the shapes of the guide pins 241, 242 may be any suitable shape so as to guide the combination of the first device 100 with the second device 200, and support the first device 100 when it is coupled with the second device 200.

The fixing member 230 is inserted into the aforementioned first fixing member 151 or the aforementioned second fixing member insertion groove 152, thereby fixing and supporting the first device 100 when it is coupled with the second device 200.

Referring to FIGS. 4A, 4B, and 5, the fixing member 230 includes a base 230A disposed inside the first device 100 and a coupling part 230B protruded towards the inside of the coupling groove 220. The coupling part 230B of the fixing member 230 has a shape matching the first fixing member insertion groove 151 and second fixing member insertion groove 152. In the present exemplary embodiment, the coupling part 230B of the fixing member 230 is formed as a rectangular panel shape having a uniform thickness, having an external surface including a first external surface 231, second external surface 232, and third external surface 233. In alternative exemplary embodiments, the fixing member 230 may have a coupling part 230B, without a base 230A, such that the coupling part 230B is further extended towards the inside of the second device 200.

The coupling part 230B of the fixing member 230 is protruded from the inner surface (first supporting surface 221 and second supporting surface 222) of the coupling groove 220 with a specific protruding angle $\beta$. The protruding angle $\beta$ is defined as an inclination angle of the fixing member 230 (more precisely, the coupling part 230B) with respect to the upper surface 201 of the second device, and more particularly, an inclination angle of the first and second external surfaces 231, 232 of the fixing member 230 (more precisely, the coupling part 230B) with respect to the upper surface of the second device 200. In the present exemplary embodiment, the protruding angle $\beta$ is approximately 105°, but may be another angle in alternative exemplary embodiments.

By the coupling part 230B of the fixing member 230, the inner surface having the coupling groove 220 of the second device 200 is divided into a first supporting surface 221 and a second supporting surface 222. In the first supporting surface 221 of the coupling groove 220, one protection member 221a is attached, and on the second supporting surface 222 of the coupling groove 220, two protection members 222a, 222b are attached. The protection members 222a, 222b are formed by elastic material such as rubber, thereby minimizes and/or prevents the external surface of the first device 100 from being damaged by the second device 200 in a combining process.

Figure 6A:
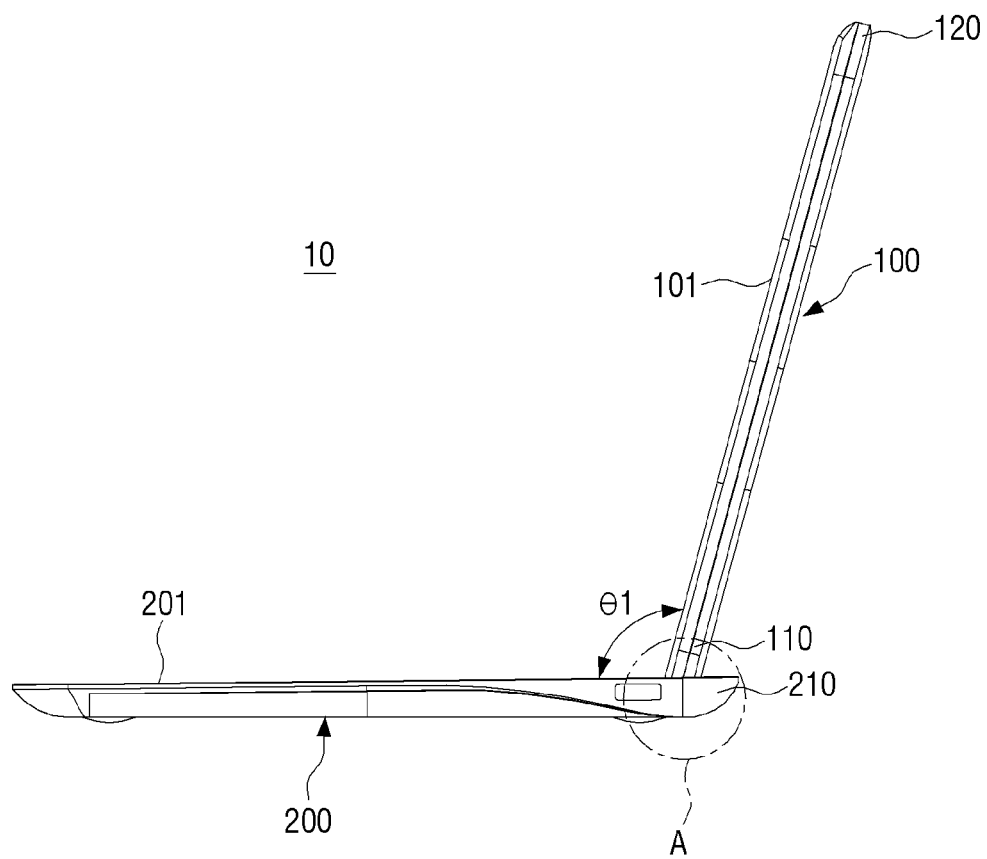
FIG. 6A is a side view of the portable computing apparatus illustrated in FIG. 1, illustrating how a lower end of the first device is coupled with the second device.
Figure 6B:
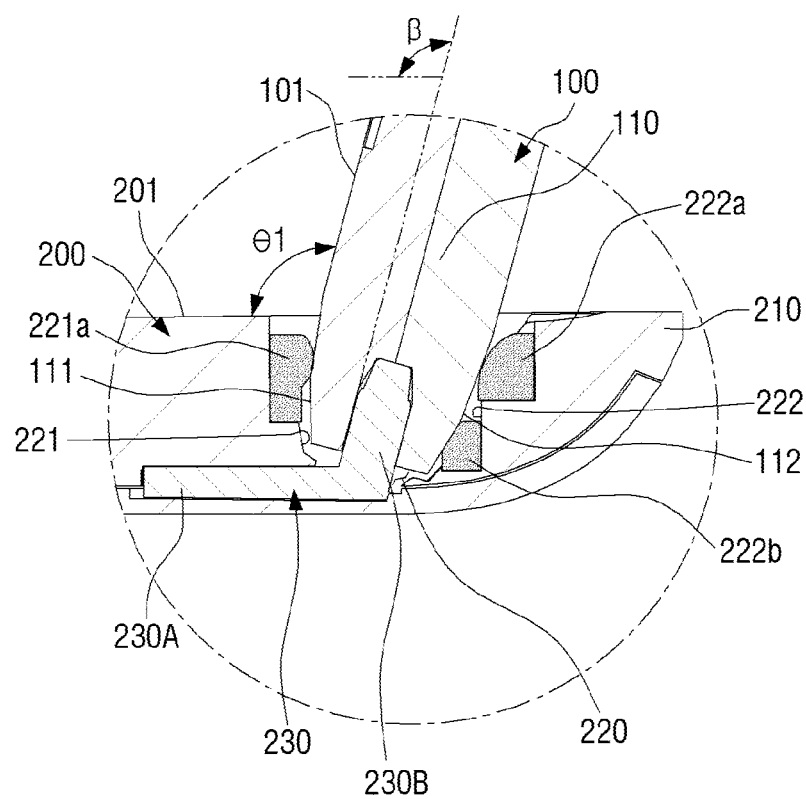
FIG. 6B is an expanded cross-sectional view corresponding to A area of FIG. 6A, illustrating how a first fixing member insertion groove is coupled with a fixing member of the second device.
Figure 6C:
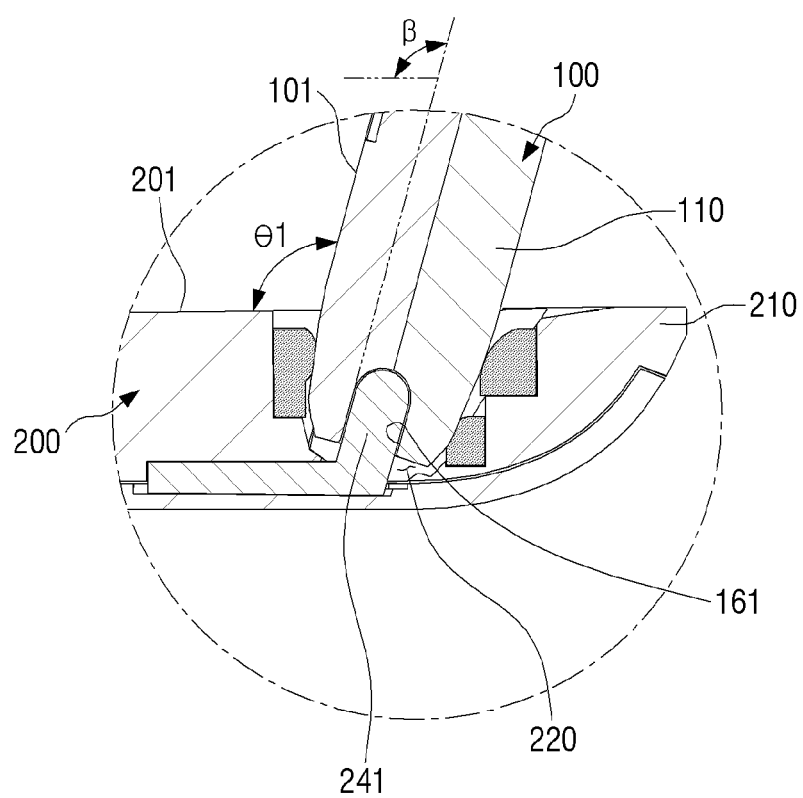
FIG. 6C is an expanded cross-sectional view corresponding to the A area of FIG. 6A, illustrating how a first pin groove of the first device is coupled with a guide pin of the second device.

FIG. 6A is a side view of the portable computing apparatus 10 illustrated in FIG. 1, illustrating how the lower end 110 of the first device 100 is coupled with the second device 200. FIG. 6B is an expanded cross-sectional view corresponding to area A of FIG. 6A, illustrating how the first fixing member insertion groove 151 of the first device 100 is coupled with the fixing member 230 of the second device 200. FIG. 6C is an expanded cross-sectional view corresponding to area A of FIG. 6A, illustrating how the first pin groove 161, 162 of the first device 100 is coupled with the guide pin 241, 242 of the second device 200.

With reference to FIG. 6A, the first device 100 has a first coupling position where its lower end 110 is coupled with the coupling groove 220 (see FIG. 5) of the second device 200 by a first connection angle $\theta 1$. Herein, the connection angle (e.g., connection angle $\theta 1$) is defined as an angle between the first device 100 and the second device 200 when they are coupled with each other, more particularly, an angle between an image display surface 101 of the first device 100 and an upper surface 201 of the second device when the first device 100 and second device 200 are coupled with each other.

With reference to FIG. 6B, at the first coupling position, the lower end 110 of the first device 100 is coupled with the coupling groove 220 of the second device 200. Herein, the fixing member 230 provided in the coupling groove 220 of the second device 200 is inserted into the first fixing member insertion groove 151 formed on the lower end 110 of the first device 100, thereby fixing and supporting the second device 200.

As aforementioned, the first fixing member insertion groove 151 is parallel to the image display surface 101, that is, the inclination angle of the first fixing member insertion groove 151 with respect to the image display surface 101 is 0°, and thus it can be understood that at the first coupling position, the first connection angle $\theta 1$ between the first device 100 and the second device 200 is the same as the protruding angle $\beta$ (illustrated in FIG. 5) of the fixing member 230. In the present exemplary embodiment, the protruding angle $\beta$ of the fixing member 230 is approximately 105°, and thus the first connection angle $\theta 1$ is also approximately 105°.

With reference to FIG. 6B, at the first coupling position, the front surface of the lower end 110 of the first device 100 is supported to the first supporting surface 221 of the coupling groove 220 of the first front surface 111, where the protection member 221a provided in the first supporting surface 221 minimizes and/or prevents the first front surface 111 from being damaged in a coupling process. In the first coupling position, the rear surface of the lower end 110 of the first device 100, that is the first rear surface 112 is supported by the second supporting surface 222 of the coupling groove 220, where the protection members 222a, 222b are provided on the second support surface 222. The protection members 222a, 222b provided on the second supporting surface 222 minimize and/or prevent the first rear surface 112 from being damaged in a coupling process.

With reference to FIG. 6C, a pair of guide pins 241, 242 provided in the second device 200 at the first coupling position are inserted into the pair of first pin grooves 161, 162 formed on the lower end of the first device 100 thereby guiding the coupling between the first device 100 and second device 200 and supporting the first device 100 at the first coupling position.

Figure 7A:
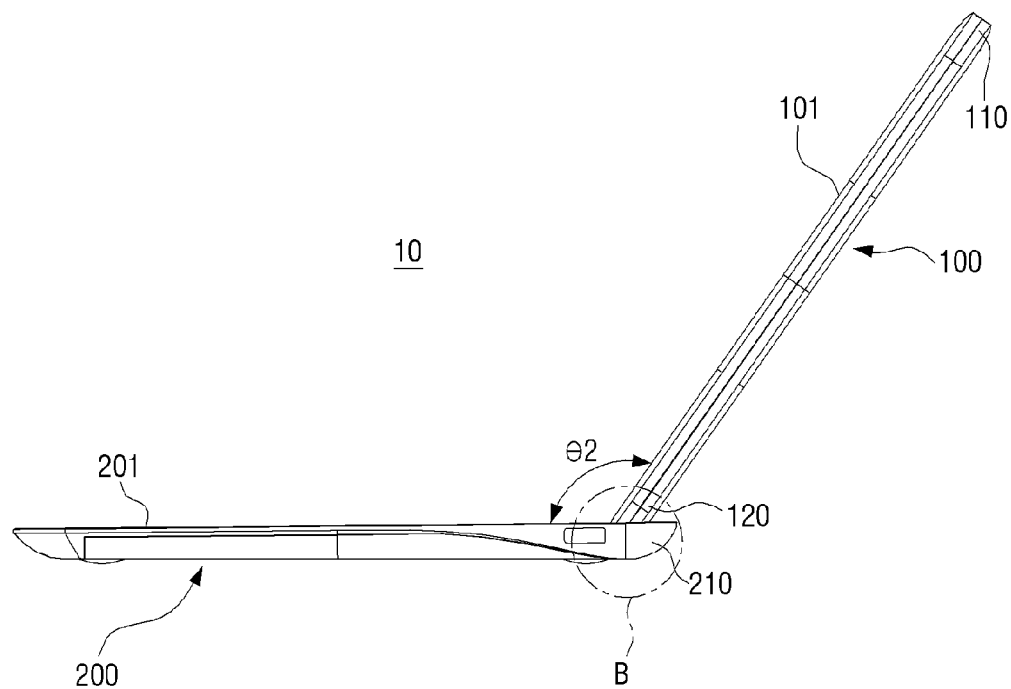
FIG. 7A is a side view of the portable computing apparatus illustrated in FIG. 1, illustrating how an upper end of the first device is coupled with the second device.
Figure 7B:
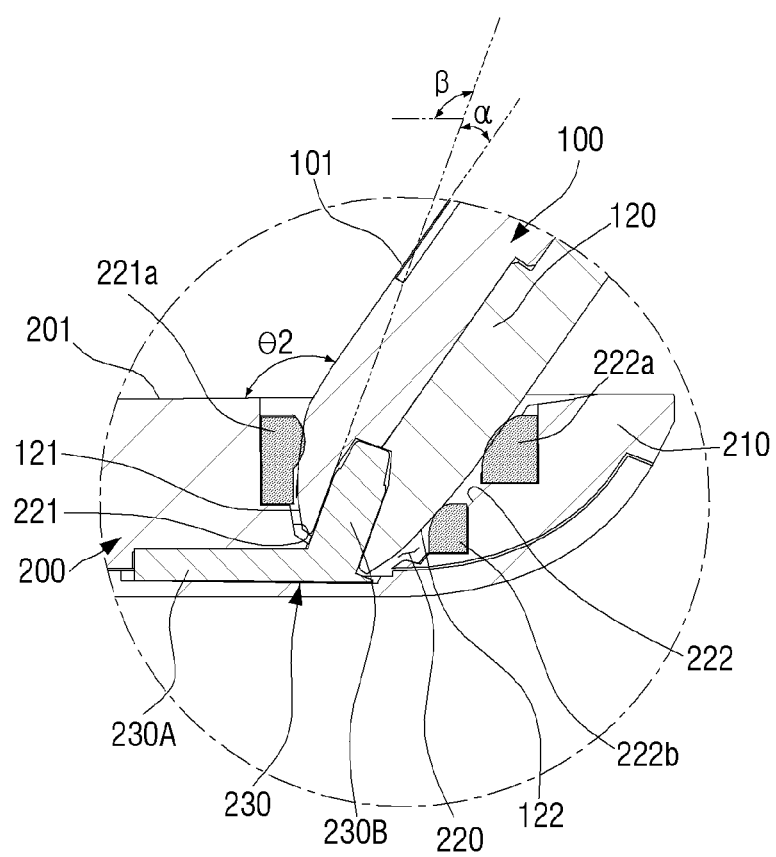
FIG. 7B is an expanded cross-sectional view corresponding to B area of FIG. 7A, illustrating how a second fixing member insertion groove of the first device is coupled with a fixing member of the second device.
Figure 7C:
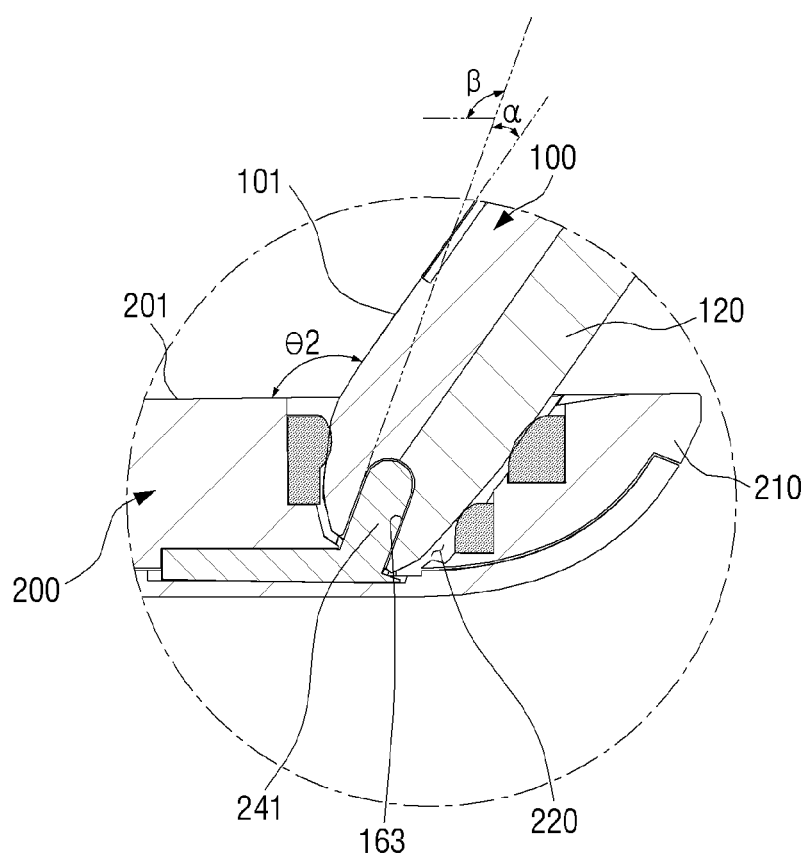
FIG. 7C is an expanded cross-sectional view corresponding to B area of FIG. 7A, illustrating how a second pin groove of the first device is coupled with a guide pin of the second device.

FIG. 7A is a side view of the portable computing apparatus 10 illustrated in FIG. 1, illustrating how the upper end 120 of the first device 100 is coupled with the second device 200, FIG. 7B is an expanded cross-sectional view corresponding to area B of FIG. 7A, illustrating a combination of the second fixing member insertion groove 152 of the first device 100 and the fixing member 230 of the second device 200, and FIG. 7C is an expanded cross-sectional view corresponding to area B of FIG. 7A illustrating a combination of the second pin groove 163, 164 of the first device 100 and the guide pin 241, 242 of the second device 200.

With reference to FIG. 7A, the first device 100 has a second coupling position where its lower end 120 is coupled with the coupling groove 220 (see FIG. 5) of the second device 200 by a second connection angle θ2.

With reference to FIG. 7B, at the second coupling position, the upper end 120 of the first device 100 is coupled with the coupling groove 220 of the second device 200. Herein, the fixing member 230 provided in the coupling groove 220 of the second device 200 is inserted into the second fixing member insertion groove 152 formed on the upper end 120 of the first device 100 thereby fixing and supporting the second device 200.

At the second coupling position, the second connection angle θ2 between the first device 100 and the second device 200 is sum of the protruding angle β (see FIG. 3) of the fixing member 230 and the inclination angle α of the second fixing member insertion groove 152 with respect to the image display surface 101. As aforementioned, the inclination angle α of the insertion groove 152 of the second fixing member 152 is approximately 20°, and the protruding angle β of the fixing member 230 is approximately 105°, and thus the second connection angle θ2 is approximately 125°. It can be understood that the second connection angle θ2 at the second coupling position is different from the first connection angle θ1 at the first coupling position.

With reference to FIG. 7B, at the second coupling position, the front surface of the upper end 120 of the first device 100, that is the second front surface 121 is supported to the first supporting surface 221 of the coupling groove 220, where the protection member 221a provided on the first supporting surface 221 prevents the second front surface 121 from being damaged in a coupling process. At the second coupling position, the rear surface of the upper end 120 of the first device 100, that is the second rear surface 122 is supported to the second supporting surface 222 of the first device 100, where the protection members 222a, 222b provided on the second supporting surface 222 prevents the second rear surface 122 from being damaged in a coupling process.

With reference to FIG. 7C, at the second coupling position, the one pair of guide pins 241, 242 provided in the coupling groove 220 of the second device 200 are inserted into the one pair of second pin grooves 163, 164 formed in the upper end 120 of the first device 100, thereby coupling the first device 100 and second device 200, and supporting the first device 100 at the second coupling position.

The user may combine the first device 100 with the second device 200 so that it has a first coupling position (see FIG. 6A) or a second coupling position (FIG. 7A), and then use the second device 200 to perform an input operation of typing, etc. The first device 100 is held by the second device 200, and thus increasing the convenience to a user that the first device 100 need not be held, and further, an input operation may be performed with increased ease and quickness since a professionalized second device 200 is used.

Data signals input by the second device 200 may be transmitted to the first device 100 in a wireless communication method (for example, bluetooth). That is, input can be received from the input keys 203 and/or the touch pad 205, with the input being converted to data signals by the second device 200, and may be transmitted via a wired and/or wireless communications interface of the second device 200 to the first device 100. As an alternative, the data signals input by the second device 200 may be transmitted to the first device 200 in a wired communication method.

In order to perform data signal transmission in a wired communication method, the first device 100 may have a transmission connector in the first and second fixing member insertion grooves 151, 152, and the second device 200 may be changed to have a form of having a connector insertion groove where the transmission connector is inserted into the fixing member 230.

Figure 8A:
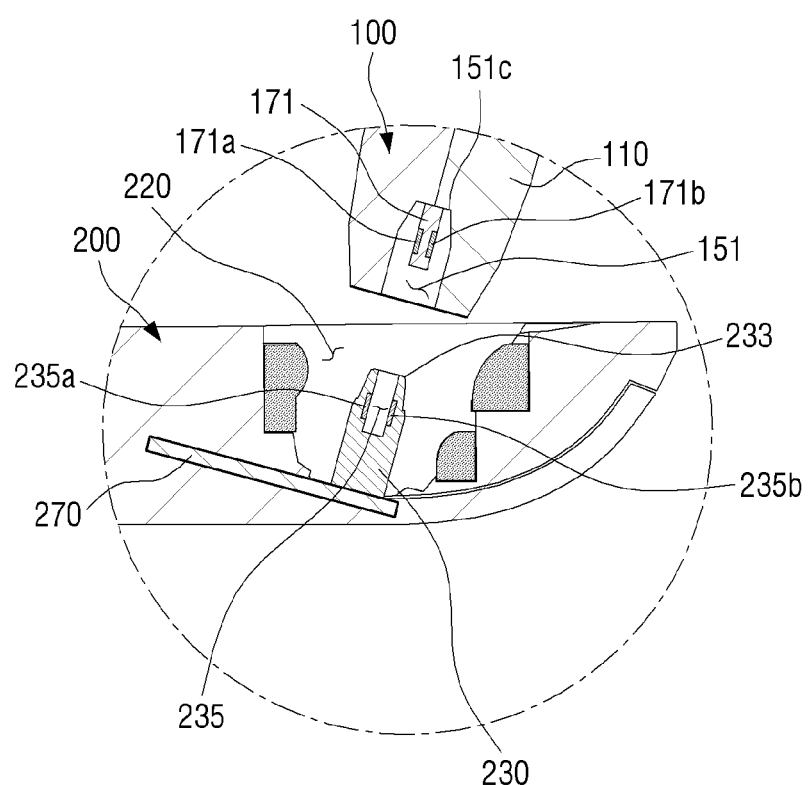
FIG. 8A is a cross-sectional view illustrating a lower end of the first device and an upper end of the second device according to an exemplary embodiment of the present general inventive concept.

Detailed explanation on alternative exemplary embodiments of the present general inventive concept are made with reference to FIGS. 8A, 8B, 9A, and 9B hereinbelow. FIG. 8A is a cross-sectional view illustrating a lower end 110 of the first device 100 and an upper end 210 of the second device 200 according to an exemplary embodiment of the present general inventive concept, and FIG. 8B is a cross-sectional view illustrating how the lower end 110 of the first device 100 of FIG. 8A is coupled with the second device 200, and FIG. 9A is a cross-sectional view illustrating an upper end 120 of the first device 100 and upper end 210 of the second device 200 according to an exemplary embodiment of the present general inventive concept, and FIG. 9B is a cross-sectional view illustrating how the upper end 120 of the first device 100 of FIG. 9A is coupled with the second device 200.

With reference to FIG. 8A, in the first fixing member insertion groove 151 of the first device 100, a first transmission connector 171 is provided in its inner surface 151c, while in the fixing member 230 of the second device 200, a connector insertion groove 235 is formed in its external surface 233. In the first transmission connector 171, a plurality of pins 171a, 171b are provided for data signal transmission and electricity transmission, and in the connector insertion groove 235, a plurality of pins 235a, 235b corresponding to the aforementioned plurality of pins 171a, 171b are provided. The fixing member 230 is mounted to a printed circuit board (PCB) 270 embedded inside the second device 200 for data signal and electricity transmission.

Figure 8B:
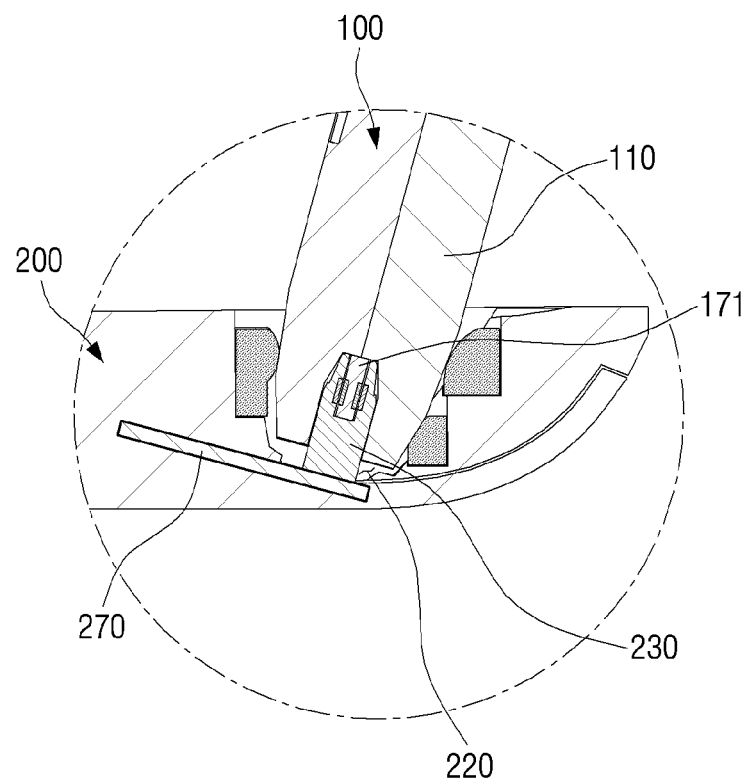
FIG. 8B is a cross-sectional view illustrating how a lower end of the first device of FIG. 8A is coupled with the second device.

With reference to FIG. 8B, in the case where the first device 100 has a first coupling position, the fixing member 230 is inserted into the first fixing member insertion groove 151 while at the same time the first transmission connector 171 is inserted into the connector insertion groove 235. Therefore, through a contact between the pins 171a, 171b of the first transmission connector 171 and the pins 235a, 235b of the connector insertion groove 235, data signals input by the second device 200 may be transmitted to the first device 100, and electricity transmission may be performed between the first device 110 and second device 200.

Figure 9A:
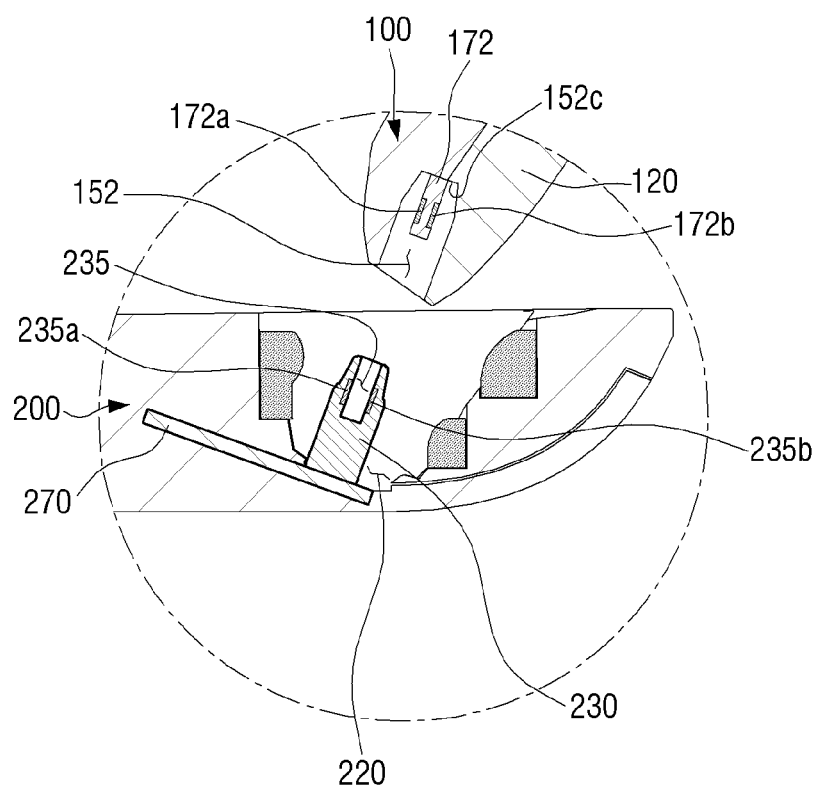
FIG. 9A is a cross-sectional view illustrating an upper end of the first device and an upper end of the second device according to an exemplary embodiment of the present general inventive concept.
Figure 9B:
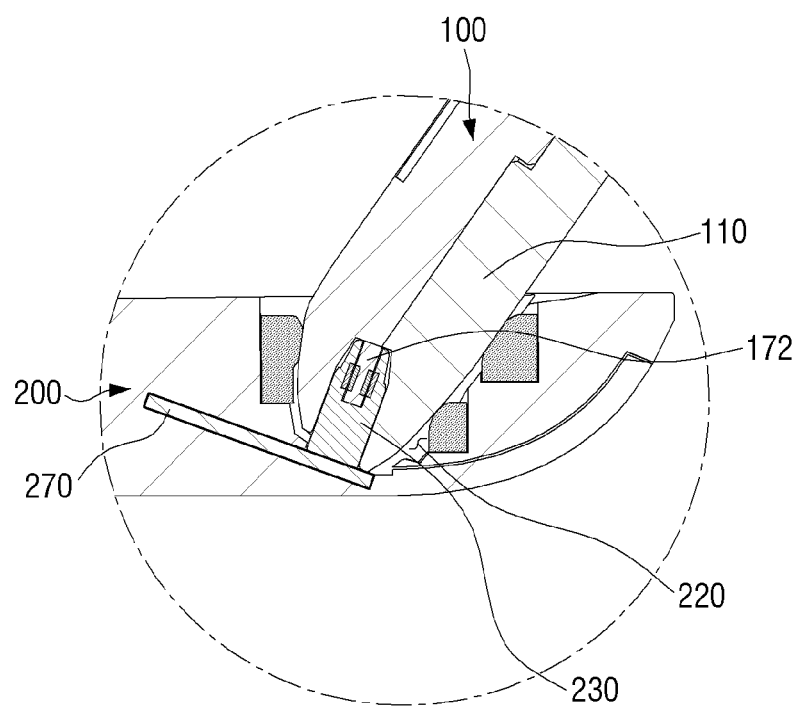
FIG. 9B is a cross-sectional view illustrating how an upper end of the first device of FIG. 9A is coupled with the second device.

With reference to FIG. 9A, in the second fixing member insertion groove 152 of the first device 100, a second transmission connector 172 is provided in its inner surface 152c, and in the second transmission connector 172, a plurality of pins 172a, 172b corresponding to the aforementioned plurality of pins 235a, 235b of the connector insertion groove 235 are provided.

With reference to FIG. 9B, the first device 100 has a second coupling position, the second transmission connector 172 is inserted into the connector insertion groove 235 at the same time the fixing member 230 is inserted into the second fixing member insertion groove 152. Therefore, through a contact between the pins 172a, 172b of the second transmission connector 172 and the pins 235a, 235v of the connector insertion groove 235, data signals input by the second device 200 may be transmitted to the first device 100, and electricity transmission may be performed between the first device 100 and second device 200.

Figure 10:
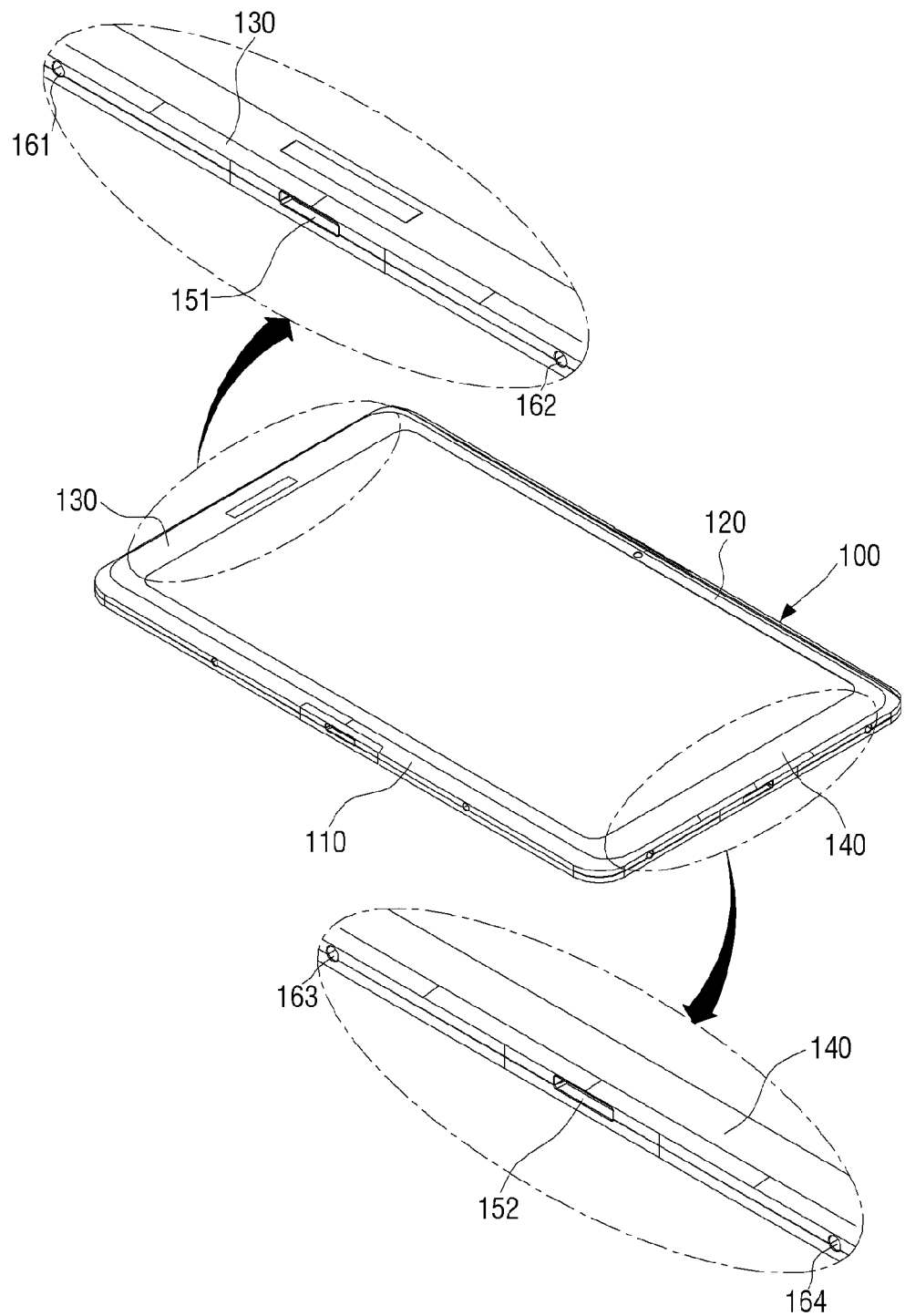
FIG. 10 is a perspective view illustrating a first device according to an exemplary embodiment of the present general inventive concept.
Figure 11:
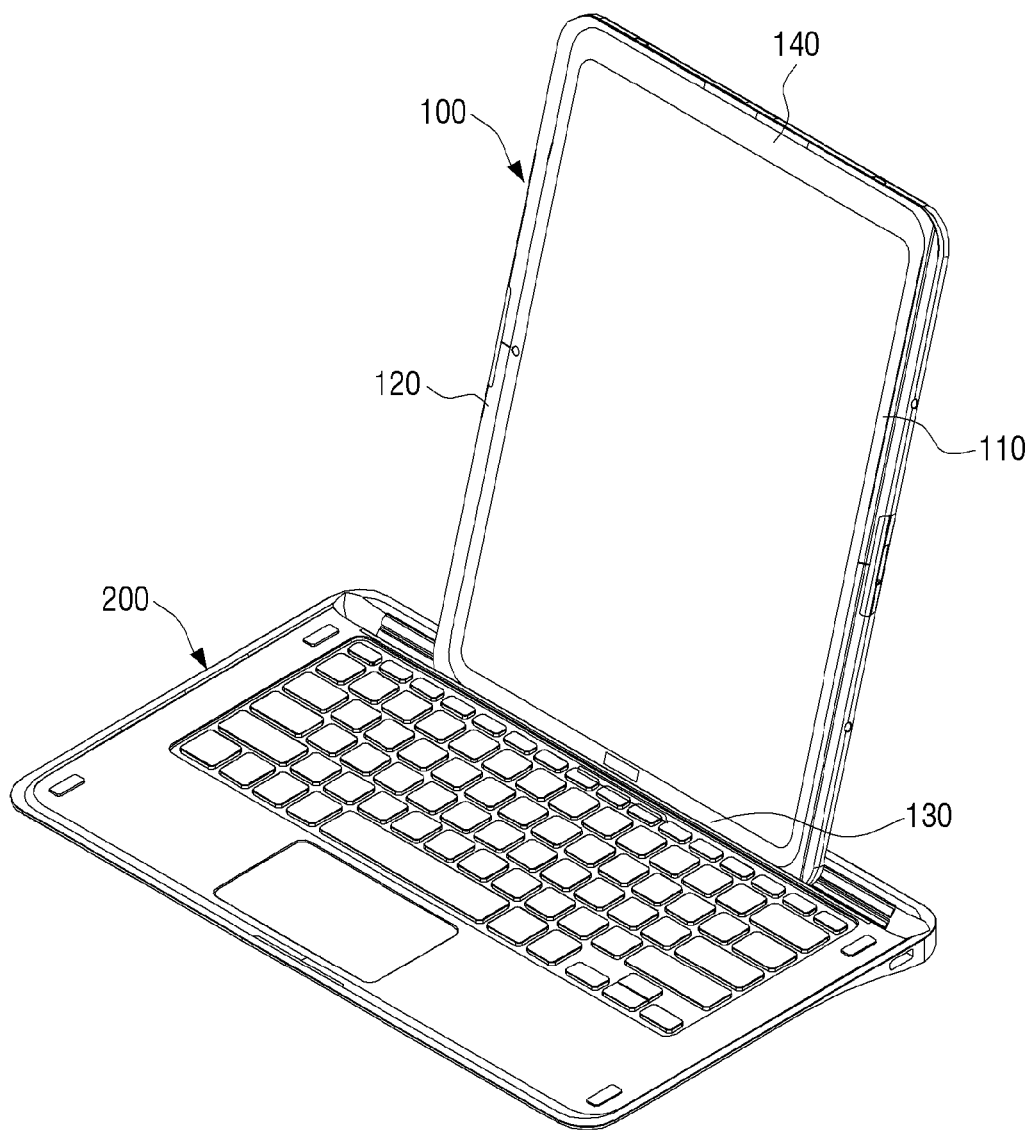
FIG. 11 is a perspective view illustrating how the first device of FIG. 11 is coupled with the second device through its left end.
Figure 12:
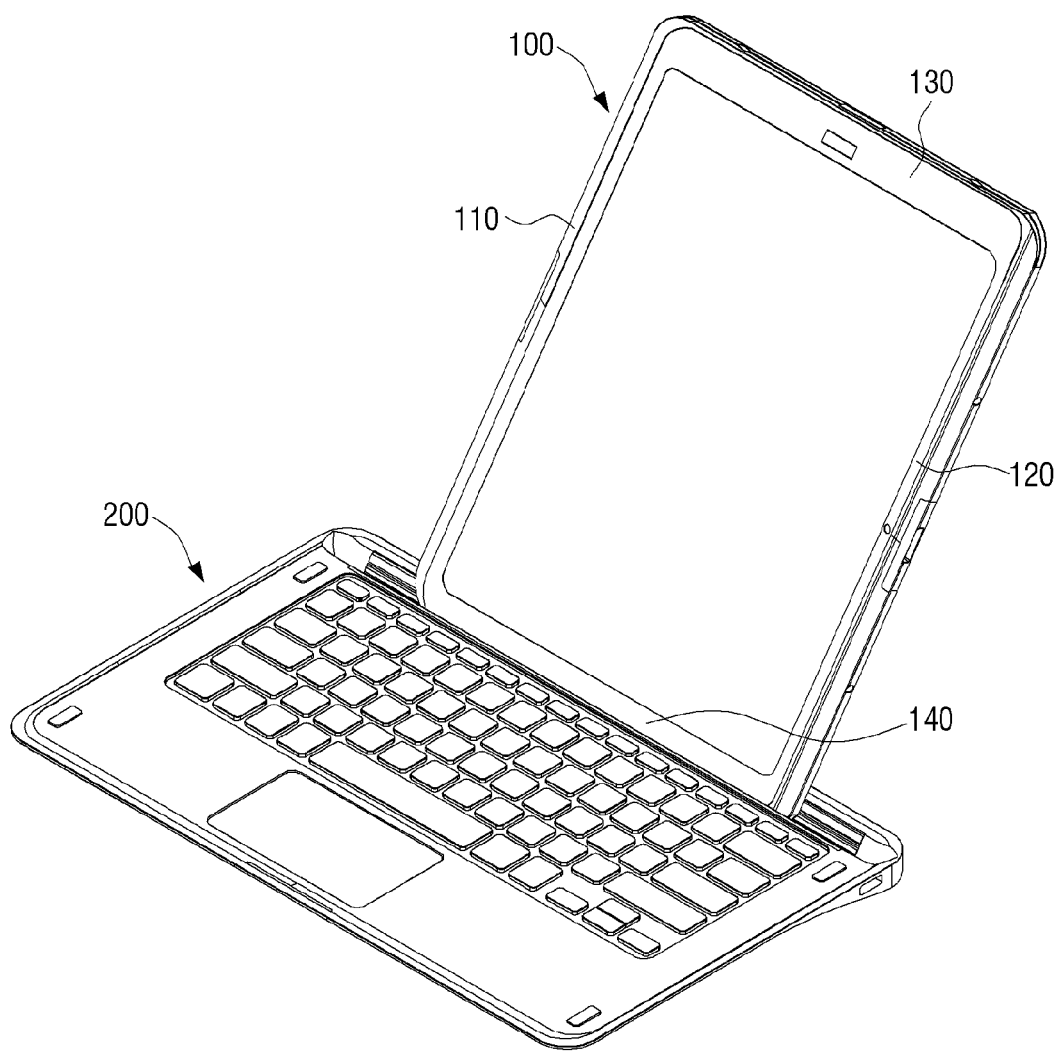
FIG. 12 is a perspective view illustrating how the first device of FIG. 11 is coupled with the second device through its right end.

FIG. 10 is a perspective view illustrating a first device 100 according to another exemplary embodiment of the present general inventive concept, FIG. 11 is a perspective view where the first device 100 of FIG. 11 is coupled with the second device 200 through its left end 130, and FIG. 12 is a perspective view where the first device 100 of FIG. 11 is coupled with the second device 200 through its right end 140.

With reference to FIG. 10, the first fixing member insertion groove 151 and the first pin grooves 161, 162 are formed on the left end 130 of the first device instead of the lower end 110 of the first device 100, whereas the second fixing member insertion groove 152 and the second pin grooves 163, 164 are formed on the right end 140 of the first device 100 instead of the upper end 120 of the first device.

Therefore, the first device 100 may have a coupling position where its left end 130 is coupled with the second device 200 as illustrated in FIG. 11, or a coupling position where its right end 140 is coupled with the second device 200.

In another exemplary embodiment of the present general inventive concept, the first fixing member insertion groove 151 and the first pin grooves 161, 162 may each be formed on the lower end 110 and left end 130 of the first device 100, and the second fixing member insertion groove 152 and the second pin grooves 163, 164 may each be formed on the upper end 120 and right end 140 of the first device 100. In the case of this exemplary embodiment, the first device 100 may have four coupling positions. That is, the first device 100 may have a first coupling position (see FIG. 6A) where its lower end 110 is coupled with the second device 200, a second coupling position (see FIG. 7A) where its upper end 120 is coupled with the second device 200, a third coupling position where its left end 130 is coupled with the second device 200, and a fourth coupling position (see FIG. 12) where its right end 140 is coupled with the second device 200.

Figure 13:
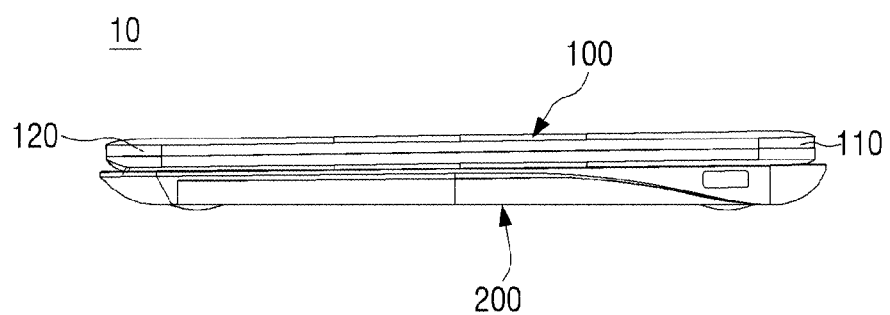
FIG. 13 is a side view of the portable computing apparatus of FIG. 1, illustrating how the first device and the second device are disposed to overlap each other when they are not used.

FIG. 13 is a side view of the portable computing apparatus 10 of FIG. 1, illustrating how the first device 100 and the second device 200 are disposed to overlap each other when they are not used.

As illustrated in FIG. 13, when the portable computing apparatus 10 is not used but is being stored or is being transferred, the first device 100 and the second device 200 may be disposed to overlap each other. Herein, it is desirable that the first device 100 is disposed such that its image display surface 101 (see FIG. 1) faces the upper surface 210 of the second device 200.

As illustrated in FIG. 1, on the upper surface 201 of the second device 200, four friction pads 251, 252, 253, 254 are provided. For example, the friction pads 251, 252, 253, and 254 may be made of rubber. Such friction pads 251, 252, 253, and 254 may minimize and/or prevent slipping between the first device 100 and second device 200, thereby enabling stable disposition of the portable computing apparatus 10 illustrated in FIG. 13.

Although not illustrated herein, inside each of the first and second devices 100 and 200, respectively, four magnet members may be additionally provided in locations corresponding to the locations of the friction pads 251, 252, 253, and 254. Disposition of the portable computing apparatus 10 illustrated in FIG. 13 may be maintained more safely as magnetic force applies between the four magnetic members provided in the first device 100 and the four magnetic members provided in the second device 200.

As aforementioned, by the portable computing apparatus 10 according to the present general inventive concept, it is possible to perform combinations between the first device 100 and second device with various coupling positions, and at least two or more connection angles may be provided. In addition, a coupling between the first device 100 and second device 200 is performed without application of a hinge structure which may deteriorate the exterior design quality, and thus may improve the exterior design quality of the first device 100 and second device 200.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. A portable computing apparatus comprising:
    a first device; and
    a second device having a coupling groove where the first device is detachably coupled,
    wherein
    the first device has a first coupling position where a first end of the first device is coupled with the coupling groove by a first connection angle, and a second coupling position where a second end of the first device is coupled with a second connection angle different from the first connection angle,
    the second device comprises a fixing member protruded from an inner surface of the coupling groove with a protruding angle,
    the first device has a first fixing member insertion groove formed on the first end so that the fixing member is inserted at the first coupling position, and a second fixing member insertion groove formed on the second end so that the fixing member is inserted at the second coupling position,
    the first device has an image display surface, and
    an inclination angle of the first fixing member insertion groove with respect to the image display surface and an inclination angle of the second fixing member insertion groove with respect to the image display surface are different from each other so that the first connection angle and the second connection angle are different from each other.

2. The portable computing apparatus according to claim 1, wherein each of the first end and second end of the first device has an exterior shape matching that of the coupling groove.

3. The portable computing apparatus according to claim 1, wherein the protruding angle is same as the first connection angle.

4. The portable computing apparatus according to claim 1, wherein each of the first fixing member insertion groove and second fixing member insertion groove has a shape matching that of the fixing member.

5. The portable computing apparatus according to claim 1, wherein a difference between the inclination angle of the first fixing member insertion groove and the inclination angle of the second fixing member insertion groove is same as a difference between the first connection angle and the second connection angle.

6. The portable computing apparatus according to claim 1, wherein the second connection angle is the sum of the inclination angle and the protruding angle.

7. The portable computing apparatus according to claim 1, wherein on each inner surface of the first and second fixing member insertion grooves, a transmission connector is provided, and on the fixing member, there is formed a connector insertion groove where the transmission connector is inserted when the first device is coupled with the second device.

8. The portable computing apparatus according to claim 1, wherein on an inner surface of the coupling groove, at least one guide pin is provided for guiding a coupling between the first device and second device, and
wherein on a first end of the first device, there is provided at least one first pin groove where the guide pin is inserted at the first coupling position, and on a second end of the first device, there is formed at least one second pin groove where the guide pin is inserted at the second coupling position.

9. The portable computing apparatus according to claim 8, wherein the first fixing member insertion groove has a same inclination angle as the first pin groove, and
wherein the second fixing member insertion groove and the second pin groove have a same inclination angle.

10. The portable computing apparatus according to claim 1,
wherein an inner surface of the coupling groove comprises a first support surface to support a front surface of the first device and a second support surface to support a rear surface of the first device, and
wherein to each of the first support surface and second support surface, at least one protection member for preventing damage of the first device is attached.

11. The portable computing apparatus according to claim 1,
wherein the first end and second end of the first device is a lower end and upper end of the first device.

12. The portable computing apparatus according to claim 1,
wherein the first end and second end of the first device is a left end and right end of the first device.

13. The portable computing apparatus according to claim 1,
wherein the first device further has a third coupling position where a third end of the first device is coupled with the coupling groove, and a fourth coupling position where a fourth end of the first device is coupled with the coupling groove.

14. The portable computing apparatus according to claim 13,
wherein the first end, second end, third end, and fourth end of the first device is a lower end, upper end, left end, and right end of the first device.

15. The portable computing apparatus according to claim 1,
wherein the first device is a tablet computer, and the second device is a keyboard device used as a input device for the tablet computer.

16. The portable computing apparatus according to claim 15,
wherein the coupling groove is extended side to side on an upper end of the keyboard device.

17. A portable computing apparatus comprising:
a first device where a first fixing member insertion groove is formed on its first end, and a second fixing member insertion groove is formed on its second end; and
a second device having a fixing member insertable into the first and second fixing member insertion grooves,
wherein
the first device is coupled with the second device in a detachable manner by a coupling between the first fixing member insertion groove and the fixing member by a first connection angle, or coupled with the second device by a coupling between the second fixing member insertion groove and the fixing member by a second connection angle different from the first connection angle,
the second device has a coupling groove where a first end or second end of the first device is inserted when the first device and second device are coupled with each other,
the fixing member is disposed in the coupling groove,
the first device has an image display surface, and
an inclination angle of the first fixing member insertion groove with respect to the image display surface and an inclination angle of the second fixing member insertion groove with respect to the image display surface are different from each other so that the first connection angle and the second connection angle are different from each other.

* * * * *